Dec. 8, 1931.　　　G. H. BENZON, JR　　　1,835,842
FEED MECHANISM
Original Filed Dec. 8, 1928　　3 Sheets-Sheet 1

Inventor,
George H. Benzon Jr.
by his Attorneys
Howson & Howson

Dec. 8, 1931.  G. H. BENZON, JR  1,835,842
FEED MECHANISM
Original Filed Dec. 8, 1928  3 Sheets-Sheet 2

Inventor:
George H. Benzon Jr.
by his Attorneys
Howson & Howson

Dec. 8, 1931.  G. H. BENZON, JR  1,835,842
FEED MECHANISM
Original Filed Dec. 8, 1928   3 Sheets-Sheet 3
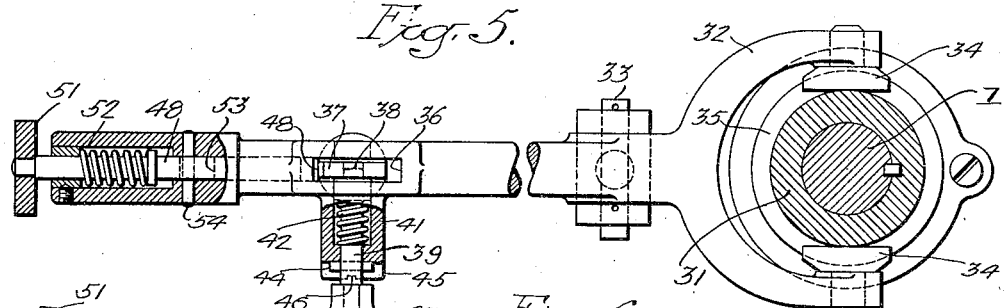
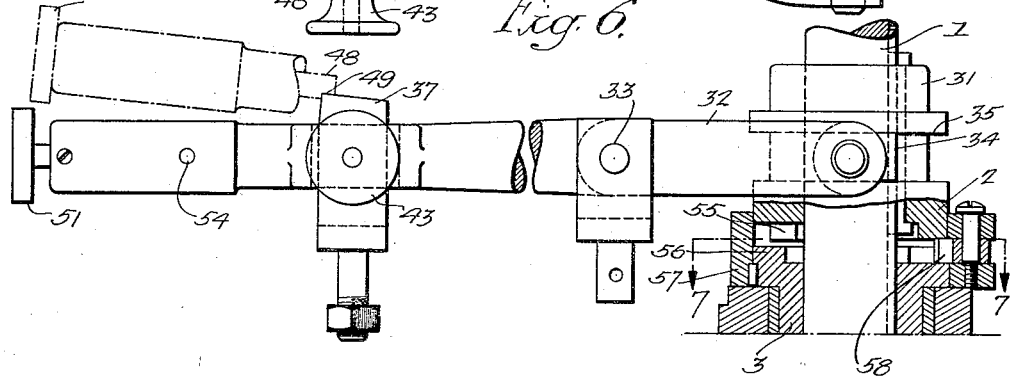
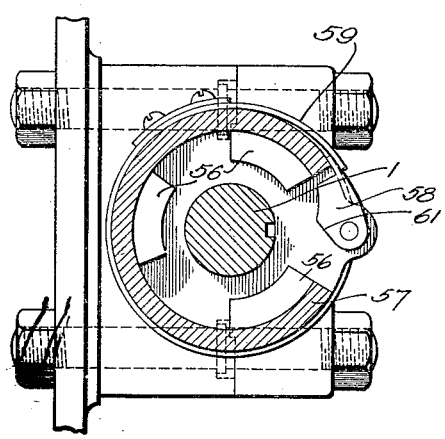
Inventor:
George H. Benzon Jr.
by his Attorneys
Howson & Howson Patented Dec. 8, 1931

1,835,842

UNITED STATES PATENT OFFICE

GEORGE H. BENZON, JR., OF JENKINTOWN, PENNSYLVANIA, ASSIGNOR TO WILLIAM SELLERS & COMPANY, INCORPORATED, OF PHILADELPHIA, PENNSYLVANIA, A CORPORATION OF PENNSYLVANIA

FEED MECHANISM

Original application filed December 8, 1928, Serial No. 324,791. Divided and this application filed March 20, 1930. Serial No. 437,624.

This invention (being a division of my application for patent filed Dec. 8, 1928, Serial No. 324,791) relates to improvements in feed mechanisms, and the principal object of the invention is to provide a novel and improved regulating adjustment for such mechanisms.

The invention further resides in a novel device affording an adjustment of the feed-regulating means as a whole with respect to its actuating mechanism.

In the attached drawings:

Fig. 5 is an enlarged sectional view on the line 5—5, Fig. 4;

Fig. 6 is a plan and partial sectional view of the parts shown in Fig. 5, and

Fig. 7 is a section on the line 7—7, Fig. 6.

Figure 2:
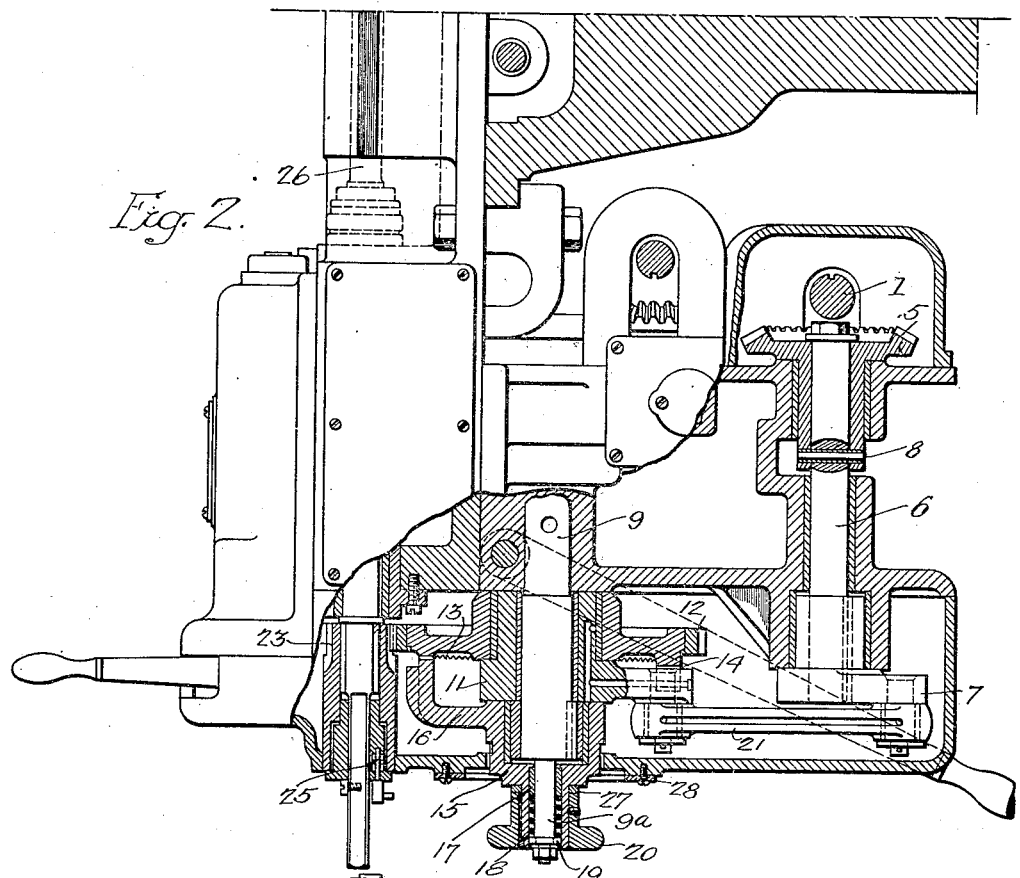
Fig. 2 is a section on the line 2—2, Fig. 1.
Figure 1:
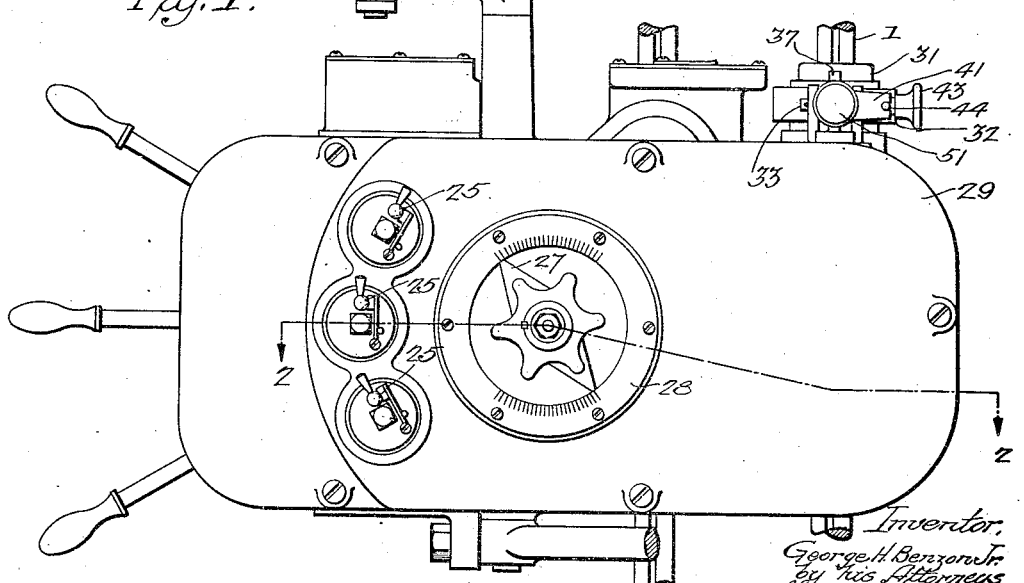
Figure 1 is a front elevational view of a mechanism made in accordance with my invention.

In the drawings, in which for purposes of illustration the invention is applied to the feed of a planer, 1 is a vertical feed shaft which may be directly connected, for example, to an electric motor (not shown). This shaft is operatively connected through the medium of a clutch 2 with a sleeve 3 which has at its lower end a bevel pinion 4, and this pinion 4 meshes with a bevel gear 5 on a horizontal shaft 6, which shaft has at its forward end a crank 7. In the present instance, the gear 5 is connected with the shaft 6 through the medium of a shear pin 8.

Journaled upon a stationary shaft 9 paralleling the shaft 6 is a feed arm 11, this member having an extending hub portion which constitutes a journal for a gear 12. This gear has on its forward face an annular series of serrations or teeth 13 and also a forwardly extending lug 14 which projects into the rotary path of the feed arm 11. Also journaled upon the shaft 9 outwardly of the feed arm 11 is a member 15 having a segmental projecting portion 16 which extends rearwardly towards the gear 12. The rear edge of this part 16 is toothed or serrated and adapted to engage the serrations 13 of the gear 12.

As shown in Fig. 2, the forward end of the member 15 is countersunk around the reduced portion 9a of the shaft 9 to afford a recess in the bottom of which is placed a bearing 17 and outwardly of this bearing a coiled spring 18 which abuts a washer 19 at the extremity of the shaft. This spring functions to hold the member 15 in contact with the gear 12 whereby the interlocking serrations on the said member and gear hold these elements together against relative angular movement. A knob 20 on the outer end of the member 15 affords means for sliding this member outwardly on the shaft 9 against the pressure of the spring 18 to release the interlocking serrations, thereby permitting angular adjustment of the member 15 with respect to the gear. The part 16 of the member 15 also intersects the path of the feed arm 11 and is in annular alignment with the lug 14 whereby the member 15 constitutes in effect an adjustable stop which with the lug 14 functions to limit and control the free angular movement of the feed arm 11 with respect to the gear 12.

Figure 3:
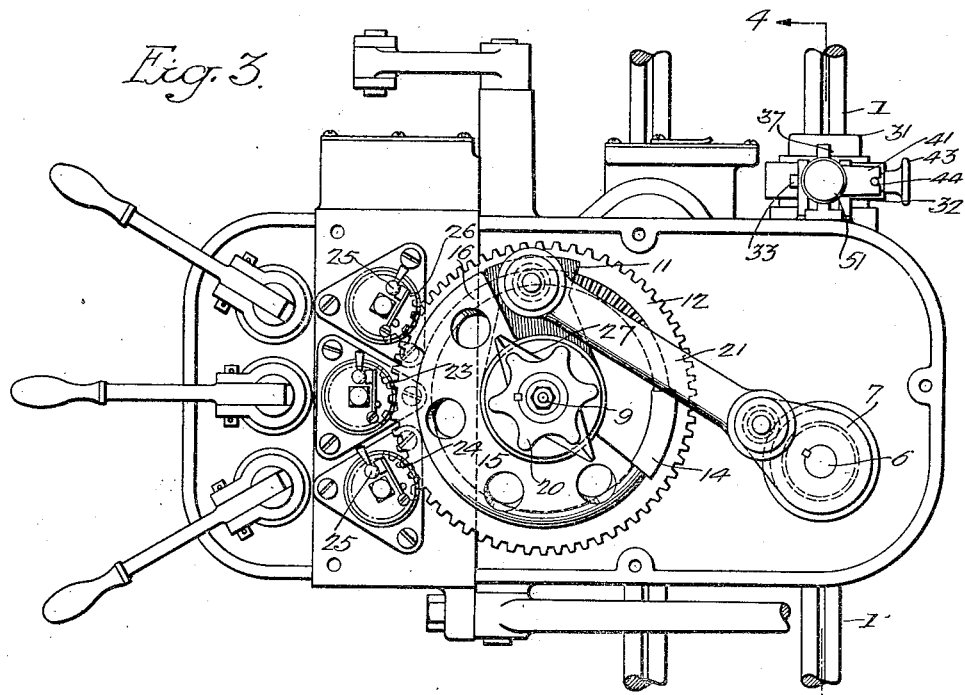
Fig. 3 is a front elevational view of the device with the cover removed to show the details.
Figure 4:
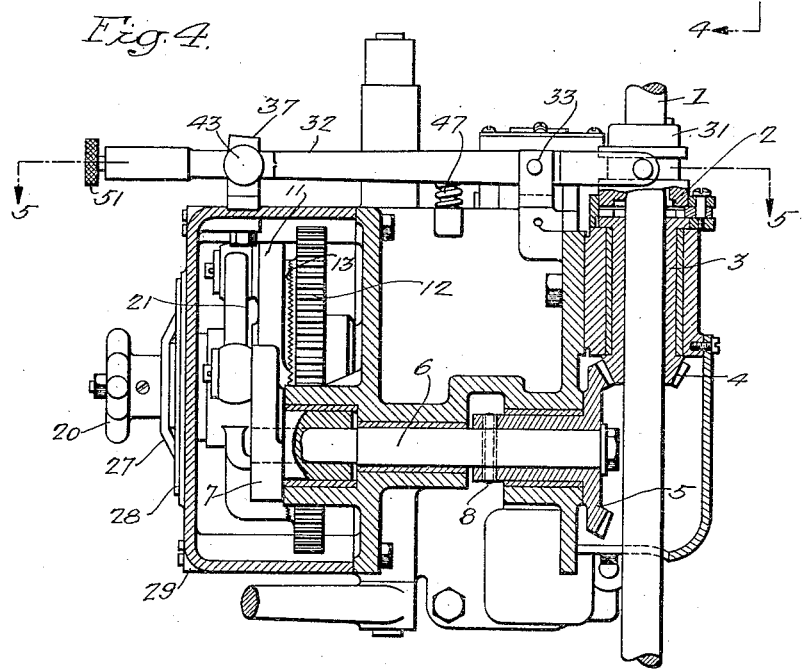
Fig. 4 is a section on the line 4—4, Fig. 3.

When as shown in Fig. 3 the stop 15 is adjusted counterclockwise into contact with the stop 14, it will be apparent that the feed arm 11 is given a maximum lost motion with respect to the gear 12, and this lost motion may be progressively reduced by adjusting the stop 16 in a clockwise direction until when the arm 11 is closely confined between the lug 14 and the member 15, the lost motion is entirely eliminated.

The feed arm 11 is connected with the crank 7 by a connecting rod 21, and the gear 12 in the present instance meshes with three pinions 22, 23 and 24, which are respectively connected through suitable pawl and ratchet devices designated generally by the reference numeral 25 with a corresponding number of shafts 26, one of which is shown in Fig. 2. These shafts in the present instance constitute respectively the feed screws for the right and left-hand tool heads, and the vertical feed rod.

In operation, the shaft 1 is actuated in accordance with the character of the feed desired. In the application illustrated and assuming that the working and recovery strokes of the ratchets 25 occur respectively at the opposite ends of the table stroke, the shaft 1 will be given one full rotation by its motor at these points. Such rotations by reason of the reduction in the gears 4 and 5 result in each instance in a rotative movement of 180° in the shaft 6, and through the connecting rod 21 in an intermittent oscillation of the feed arm 11, the advance and return movements occurring at opposite ends of the table stroke. Such oscillation results in an equal or lesser oscillation of the gear 12, depending on the setting of the stop 15, and through the ratchets 25 in a desired intermittent rotation of the shafts 26. Where the feed and ratcheting is to occur at the same end or at any other point or points in the stroke of the table, the shaft 1 may be actuated accordingly, or modification may be had by changing the speed reduction between the shafts 1 and 6. A pointer 27 is provided on the member 15 which in conjunction with a suitably calibrated ring 28 on the cover plate 29 affords an indication of the feed obtained with any setting of the member 15. The direction of rotation of the shafts 26 may be controlled through the pawl and ratchet devices 25 which may be made adjustable for that purpose.

It may be desired to adjust the feed mechanism with relation to the actuating shaft 1, such, for example, as when the direction of the feed is to be changed while maintaining the original relation of the feed to the table stroke, and I have provided in the clutch 2 means whereby the shaft 1 may be rotated with respect to the shaft 6. In conjunction with this clutch, I provide means whereby following disengagement, the clutch is automatically re-engageable following one complete rotation of the shaft 1. The details of this clutch are illustrated in Figs. 5, 6 and 7, in which it will be noted that the clutch comprises a movable member 31 keyed to the shaft 1 and adjustable axially of the shaft through a lever 32 fulcrumed at 33. The bifurcated inner end of this lever 32 carries elements 34 which project into opposite sides of an annular recess 35 in the member 31. Beyond the fulcrum 33, the lever is slotted, as shown at 36 in Fig. 5, for reception of a fixed upstanding element 37. This element has a transverse perforation 38 into which, when the lever is depressed as illustrated in the drawings, is adapted to fit the inner end of a bolt 39 slidably mounted in a boss 41 on the lever. A spring 42 tends to advance the bolt 39 into the aperture 38, and the bolt may be withdrawn manually by means of a knob 43 at its outer end. The bolt also carries a transverse projecting pin 44 which is adapted to fit into a slot 45 in the outer end of the boss 41, this slot being of sufficient depth to permit the bolt to advance into the aperture 38. By retracting the bolt 39 and giving it a quarter turn, the pin 44, when the bolt is again released, will engage in notches 46 on the outer face of the boss 41, with the result that the pin is retained in the retracted position in which the lever 32 is free from the member 37. A spring 47 is provided which tends to elevate the lever 32. The outer end of the lever is also provided with a pin 48 which extends from the outer end of the lever longitudinally into the outer end of the slot 36, this pin being provided at its inner end with a shoulder 49 which when the lever is elevated is adapted to engage one of the upper edges of the members 37, as shown in Fig. 6, to thereby prevent depression of the lever 32 until the said pin 48 is withdrawn. Such withdrawal may be accomplished manually by means of a knob 51 on the outer end of the pin 48, and a spring 52 is provided which tends to advance the pin 48 into the effective position shown in broken lines in Fig. 6. In the present instance, the pin 48 is slotted at 53 intermediate its ends for reception of a pin 54 in the lever 32. It will be noted, therefore, that means is provided for positively locking the lever 32 in an elevated position and also in a depressed position against the pressure of the spring 47.

The member 31 of the clutch is provided on its inner face with a plurality of teeth 55, these being three in number in the present instance and of different widths corresponding with the spaces between corresponding teeth or projections 56 on the upper end of the sleeve 3. By reason of the variation in the lengths, the teeth 55 of the member 31 will mesh with the teeth 56 of the sleeve 3 in one position only, whereby following release of the member 31, the clutch cannot again mesh until the shaft has completed one complete revolution.

Keyed to the upper end of the sleeve 3 is a collar 57 which at one side carries a pivoted detent 58, a spring 59 being provided which engages the outside of this detent 58 and tends to force it inwardly into the space between the teeth 56. As shown in Fig. 6 this detent 58 is somewhat greater in thickness than the teeth 56 so that it projects above the tops of the latter. Following elevation of the clutch member 31 and withdrawal of the teeth 55 from the spaces between the teeth 56, the spring 59 operates to force the detent 58 inwardly whereby a return movement of the member 31 is prevented until such time as the detent has been withdrawn. In the event, therefore, that the member 31 is elevated while the shaft 1 is stationary, the detent 58 will prevent re-engagement of the clutch. As soon as the shaft 1, however, is operated and the initial tooth passes out of engagement with the detent 58, the member 31 under the action of the spring 47 will move into engagement with the teeth 56, with the result that the teeth will successively engage one or the other of the inclined inner edges 61 of the detent and will force the latter outwardly, so that following one complete revolution, the teeth are permitted to intermesh to renew the operative connection between the shaft 1 and the sleeve 3. It is never necessary, therefore, following release of the clutch, which is accomplished manually by retracting the pin 48 and forcing the lever downwardly against the spring 47, to hold the lever down, since the detent 58 is immediately effective upon separation of the clutch elements to prevent immediate re-engagement. The adjustment accordingly is a simple one requiring only momentary depression of the lever 32.

As stated above, the clutch may be maintained in the disengaged position by the bolt 39 when this is desired. Otherwise, following disengagement of the clutch, one complete revolution of the shaft 1 will result automatically in the re-engagement.

While I have illustrated the invention as applied to planers, it will be obvious that the invention will have a general application to many forms of feed mechanisms.

I claim:

1. In feed mechanism, the combination with a shaft, of a gear rotatable about the shaft, a member journaled on the shaft and having a projecting arm, a stop on said gear projecting transversely into the path of said arm, a member movable with the gear and also projecting into the path of said arm, means for angularly adjusting said latter member with respect to the gear to vary the space between itself and the said stop in which the said arm is free to oscillate, and means for oscillating said arm.

2. In feed mechanism, the combination with a shaft, of a gear rotatable about the shaft, said gear having on its face an annular and concentric series of serrations and a projecting lug, a member adjustable about the shaft and having a serrated part adapted to engage the serrations on said gear, means for axially moving said member on the shaft to disengage the serrations to permit relative adjustment of the gear and said member, means for normally retaining the member in engagement with the serrations of said gear whereby the said member and gear are interlocked, a member journaled on the shaft and adapted in opposite movements to engage the said projecting lug of said gear and the serrated member with which the gear is interlocked, and means for oscillating the said journaled member.

GEORGE H. BENZON, Jr.